US 6,550,423 B1

(12) United States Patent
Pope

(10) Patent No.: US 6,550,423 B1
(45) Date of Patent: Apr. 22, 2003

(54) DOG WASTE DISPOSAL PAD HOLDER

(75) Inventor: Susan Crawford Pope, Bedford, TX (US)

(73) Assignee: The Bramton Company, Irving, TX (US)

( * ) Notice: Subject to any disclaimer, the term of this patent is extended or adjusted under 35 U.S.C. 154(b) by 48 days.

(21) Appl. No.: 10/114,643

(22) Filed: Apr. 1, 2002

(51) Int. Cl.$^7$ .............................................. A01K 29/00
(52) U.S. Cl. ........................................ 119/161; 119/169
(58) Field of Search ............................... 119/161, 165, 119/169, 170

(56) References Cited

U.S. PATENT DOCUMENTS

| | | | |
|---|---|---|---|
| 3,626,900 A | * 12/1971 | Failla | 119/161 |
| 3,818,865 A | * 6/1974 | Sinclair | 119/161 |
| 4,147,129 A | * 4/1979 | Ruplen | 119/169 |
| 4,715,320 A | 12/1987 | Barnhart | 119/161 |
| 4,800,677 A | * 1/1989 | Mack | 119/161 |
| 4,949,673 A | 8/1990 | Yamamoto | 119/165 |
| 5,355,837 A | * 10/1994 | Reyes | 119/161 |
| 5,630,376 A | 5/1997 | Ochi et al. | 119/169 |
| 6,059,247 A | 5/2000 | Olivadoti | 248/346.04 |
| 6,244,216 B1 | * 6/2001 | Ochi | 119/169 |
| 2001/0025910 A1 | 10/2001 | Olivadoti | 248/346.01 |

* cited by examiner

Primary Examiner—Charles T. Jordan
Assistant Examiner—Elizabeth Shaw
(74) Attorney, Agent, or Firm—Locke Liddell & Sapp LLP; Monty L. Ross

(57) ABSTRACT

An absorbent dog waste disposal pad holder lacking an underlying bottom wall and having nestable upper and lower frames that cooperate to form a peripheral wall to securely hold the periphery of a disposable, absorbent pad therebetween. Each nestable upper and lower frame comprises first and second frame members. The first and second frame members of the lower frame preferably comprise opposite side ends that interlock to form the lower frame. The first and second frame members of the upper frame preferably comprise ends that abut to form the upper frame. Preferably, the frames of the absorbent dog waste disposal pad holder are generally rectangular shaped, are made of moldable polymeric material and have an inverted U-shaped cross section. A method of assembling the subject absorbent dog waste disposal pad holder is also disclosed.

42 Claims, 2 Drawing Sheets

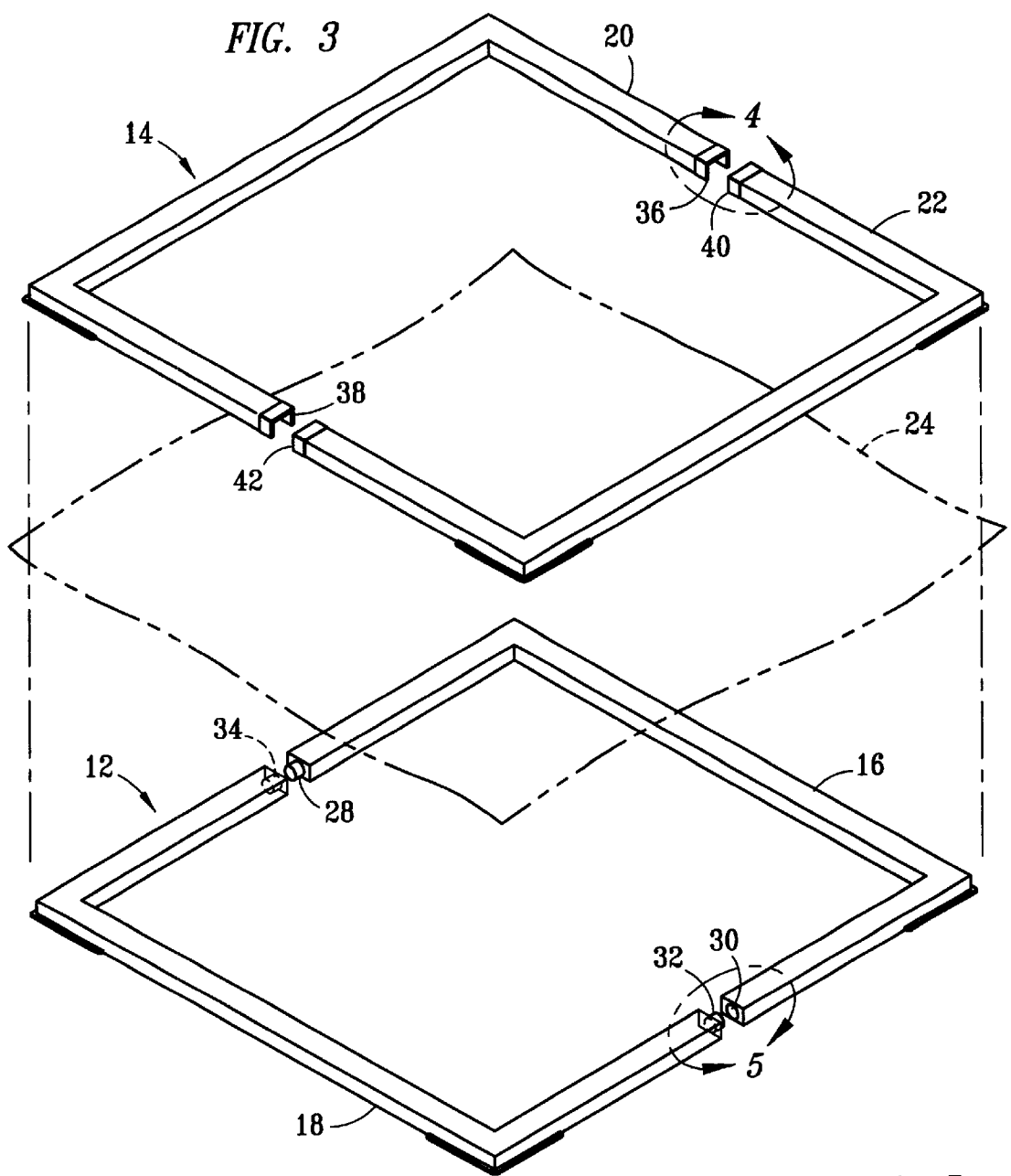
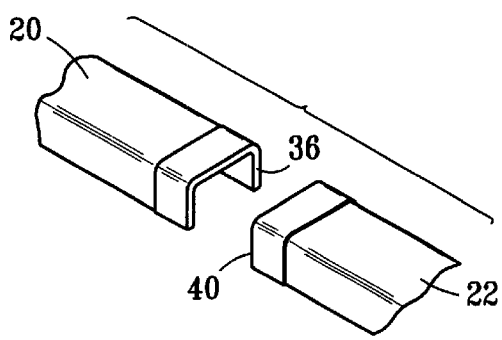
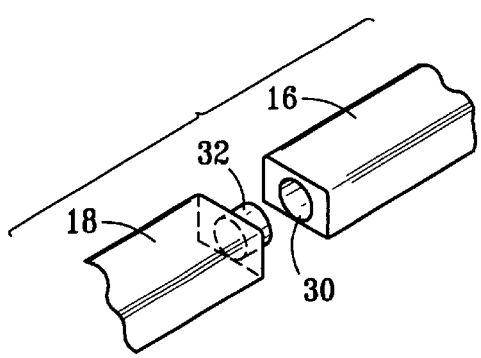

DOG WASTE DISPOSAL PAD HOLDER

BACKGROUND OF THE INVENTION

1. Field of the Invention

This invention relates to a device that securely holds a disposable, absorbent pad for the collection and disposal of dog waste. More particularly, this invention securely holds a leak-proof pad between two nesting frames.

2. Description of Related Art

Devices that ease the arduous task of housebreaking a puppy are well known in the art. Even after housebreaking is successful, these devices are useful when a pad-trained dog is left indoors for extended periods of time. Such devices are disclosed, for example, in U.S. Pat. Nos. 4,715,320; 6,059,247; 5,630,376; 4,949,673; 5,355,837; and the references cited therein. These devices hold newspaper or an absorbent sheet of material in place to prevent a dog's waste from leaking onto a floor surface and allow a dog to eliminate in a predetermined area. The absorbent sheet of material held by most prior art devices is a leak-proof pad having a plastic backing that prevents waste from leaking through the pad and onto a floor surface. Some of the prior art devices use trays or reservoirs to prevent waste from leaking onto the floor surface. Another device, U.S. Pat. No. 4,715,320, uses three hoops to loosely retain newspaper or other material to prevent waste from leaking.

However, many of the prior art devices contain complicated parts, are hard to assemble and are bulky. Other devices are not durable enough to withstand the repeated weight of a large dog or render it difficult to remove a soiled sheet of material. A device is therefore needed that securely holds a disposable, absorbent pad in place, discourages a dog from chewing or dragging the absorbent pad, is inexpensive, is easy to manufacture, has simple but reliable parts, can be packaged and stored compactly and is easy to assemble. The device also needs to be durable and allow for the easy removal of a soiled pad. These and other advantages are provided by the invention disclosed below.

SUMMARY OF THE INVENTION

An absorbent dog waste disposal pad holder is disclosed herein that provides significant advantages over the prior art. Principal structural advantages include the absence of an underlying bottom wall and a small number of compact components that are durable and easy to assemble. The absorbent dog waste disposal pad holder has nestable upper and lower generally rectangular frames, each comprising first and second frame members. The first and second frame members of the lower frame each preferably comprise one male end connector and one female end connector. The end connectors of the first frame member interlock with the opposite side end connectors of the second frame member to form the lower frame. The first and second frame members of the upper frame each preferably comprise two ends. Most preferably, the ends of the first frame member abut the ends of the second frame member to form the upper frame.

The absorbent dog waste disposal pad holder preferably is assembled by first interlocking the first and second frame members of the lower frame at first and second joints to form the lower frame. The disposable, absorbent pad is then placed on top of the lower frame. The first and second frame members of the upper frame are then placed down over the pad to frictionally engage the pad between the upper and lower frames, with the ends of the first and second frame members abutting. To provide strength and rigidity to the assembled absorbent dog waste disposal pad holder, the abutting ends of the first and second frame members of the upper frame are preferably disposed 90° from the joints connecting the first and second frame members of the lower frame.

The absorbent dog waste disposal pad holder can be packaged and stored compactly, has simple but reliable parts and is easy to assemble. The absorbent dog waste disposal pad holder also is durable, securely holds a disposable, absorbent pad in place and allows for the easy removal of a soiled pad. In particular, the lack of an underlying bottom wall reduces weight and facilitates storage and packaging. Use of the present invention makes housebreaking a dog easy and provides a place for the dog to eliminate when left indoors for extended periods.

BRIEF DESCRIPTION OF THE DRAWINGS

The invention is further described and explained in relation to the following figures of the drawing wherein:

FIG. 3 is a simplified exploded perspective view with the disposable, absorbent pad shown in phantom outline;

FIG. 4 is an enlarged detail view of one preferred frame connector of FIG. 3; and FIG. 5 is an enlarged detail view of another preferred frame connector of FIG. 3.

Like reference numerals are used to describe like parts in all figures of the drawings.

DETAILED DESCRIPTION OF THE PREFERRED EMBODIMENT

Figure 1:
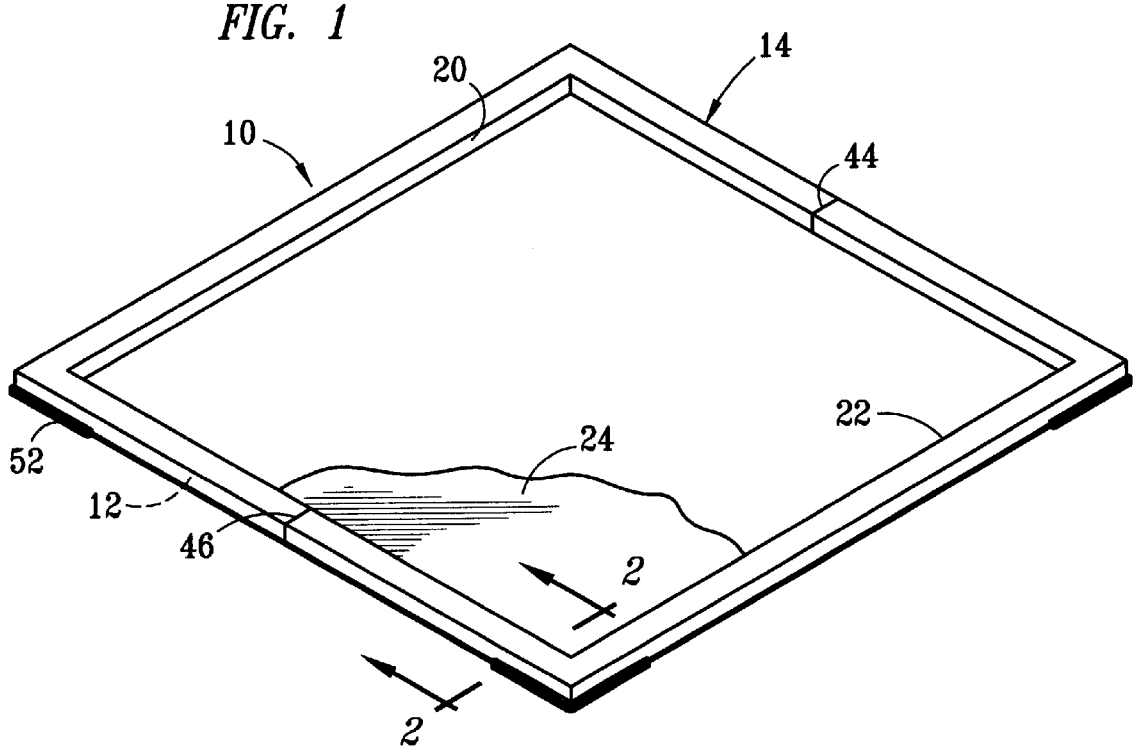
FIG. 1 is a simplified perspective view of the assembled absorbent dog waste disposal pad holder of the invention, with the disposable, absorbent pad broken away.

Referring to FIG. 1, assembled absorbent dog waste disposal pad holder 10 preferably comprises generally rectangular lower frame 12, generally rectangular upper frame 14 and disposable, absorbent pad 24. Upper frame 14 is nesting with lower frame 12 to securely hold disposable, absorbent pad 24 therebetween. Disposable, absorbent pad 24 is broken away to clearly show the lack of a underlying bottom wall. Upper frame 14 comprises first frame member 20 and second frame member 22 abutting at meeting points 44, 46. Flanges 52 may be molded onto the corners of lower frame 12 and upper frame 14 to strengthen the corners, and lower frame 12 can optionally be provided with underlying resilient adhesive-backed pads 53 (seen in FIG. 3) to prevent assembled absorbent dog waste disposal pad holder 10 from sliding when placed on a smooth surface. Although this embodiment uses generally rectangular frames, it should be understood that other frame shapes including, but not limited to, circular, square or other polygonal frames, may likewise be used to securely hold disposable, absorbent pad 24. A generally rectangular shaped frame is preferred, however, because of the availability in the market of generally rectangular-shaped disposable, absorbent puppy pads.

Figure 2:
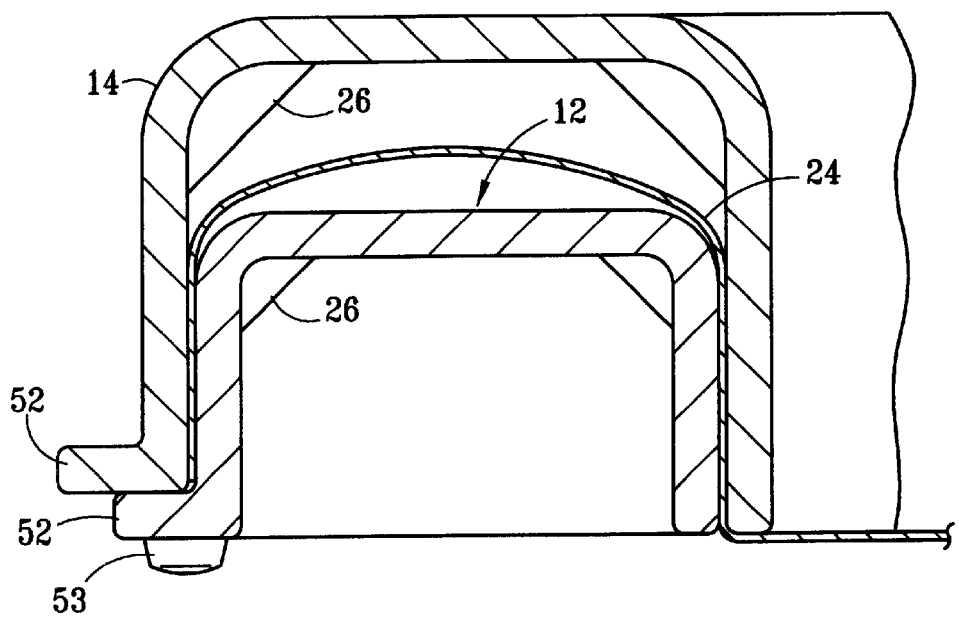
FIG. 2 is a cross-sectional view taken along line 2—2 of FIG. 1.

Referring to FIG. 2, upper frame 14 and lower frame 12 preferably have inverted U-shaped cross sections with radiused corners configured to allow upper frame 14 and lower frame 12 to nest together. Although it is preferred that the upper frame 14 and the lower frame 12 have inverted U-shaped cross sections, it is understood that other nestable cross sections including, but not limited to, semi-cylindrical cross sections, are similarly useful. Preferably, lower frame 12 and upper frame 14 are made of a moldable polymeric material. The use of a moldable polymeric material having some flexibility is particularly preferred because it allows upper frame 14 to tightly engage lower frame 12 and securely hold the disposable, absorbent pad 24. The periphery of disposable, absorbent pad 24 is securely sandwiched between upper frame 14 and lower frame 12 when absorbent dog waste disposal pad holder 10 is assembled in this manner. Disposable, absorbent pad 24 can be any thickness as long as upper frame 14 and lower frame 12 can still engage to securely hold the pad. Disposable, absorbent pad 24 is also preferably slightly larger in width and length than lower frame 12 so the pad can be securely held between upper frame 14 and lower frame 12 and still lie flat against a separate support surface underlying the pad and assembled holder. Disposable, absorbent pad 24 preferably has a leakproof plastic backing to prevent waste from leaking onto a floor surface. A plurality of reinforcement sections or gussets 26 may be disposed beneath the surface of lower frame 12 and upper frame 14 to enhance the strength and rigidity of lower frame 12 and upper frame 14.

Referring to FIG. 3, lower frame 12 comprises first frame member 16 and second frame member 18. First frame member 16 preferably comprises male end connector 28 and female end connector 30. Second frame member 18 preferably comprises male end connector 32 and female end connector 34. To form lower frame 12, male end connector 28 releasably engages female end connector 34 while male end connector 32 releasably engages female end connector 30 at joints. It will be appreciated upon reading this disclosure that connectors having different configurations can be similarly utilized within the scope of the invention. Upper frame 14 comprises first frame member 20 and second frame member 22. First frame member 20 has two ends 36, 38 and second frame member 22 has two ends 40, 42. End 36 abuts end 40 and end 38 abuts end 42 to form upper frame 14. If desired, ends 36, 38 and 40, 42 can be provided with connectors in the same manner as lower frame 12.

Referring again to FIG. 3, the invention is preferably assembled by interlocking male end connector 28 to female end connector 34 at a first joint and male end connector 32 to female end connector 30 at a second joint to form lower frame 12. Disposable, absorbent pad 24 is then placed on top of lower frame 12 covering lower frame 12. First frame member 20 and second frame member 22 are then placed to frictionally engage lower frame 12. First frame member 20 and second frame member 22 are preferably oriented such that two ends 36, 38 of first frame member 20 abut two ends 40, 42 of second frame member 22 at meeting points 44, 46. The meeting points 44, 46 are preferably disposed 90° from the joints connecting the first and second frame members of the lower frame. This orientation provides greater rigidity to absorbent dog waste disposal pad holder 10 than if the joints of lower frame 12 and upper frame 14 are located on the same sides.

Referring to FIGS. 3 and 4, first frame member 20 comprises ends 36, 38 and second frame member 22 comprises ends 40, 42. When the absorbent dog waste disposal pad holder is assembled, ends 36, 38 will abut against ends 40, 42, respectively. Again, it should be understood that there are many ways of joining first frame member 20 and second frame member 22 to form upper frame 14. First frame member 20 and second frame member 22 may be interlocked, snapped together, fastened together or connected by any other similarly effective means.

Referring to FIGS. 3 and 5, first frame member 16 comprises female end connector 30 and male end connector 28. Second frame member 18 comprises male end connector 32 and female end connector 34. Desirably, a snug fit will result when male end connectors 32, 28 and female end connectors 30, 34 are engaged. The ends of frame members 16, 18 can also be configured to abut rather than interlock, if desired. It should be understood that there are many ways of joining first frame member 16 and second frame member 18 to form lower frame 12. First frame member 16 and second frame member 18 may abut each other, may be snapped together, fastened together or connected by any other similarly effective means.

The absorbent dog waste disposal pad holder disclosed herein is inexpensive and easy to manufacture. The absorbent dog waste disposal pad holder comprises only four durable frame members and lacks a bottom underlying wall. The absorbent dog waste disposal pad holder is also easily assembled in only a few, simple steps. Further, the use of only four frame members and the lack of an underlying bottom wall allow the absorbent dog waste disposal pad holder to be packaged and stored compactly.

Although there is no underlying bottom wall, the absorbent dog waste disposal pad holder securely holds the disposable, absorbent pad to avoid leakage onto a floor surface. The absorbent dog waste disposal pad holder's ability to firmly hold the disposable, absorbent pad discourages a dog from chewing or dragging the pad. To remove the soiled pad, only two frame members have to be disassembled and removal does not entail having to pull out, twist out or overturn the pad, causing the dog waste to spill.

Other alterations and modifications of the preferred embodiment described above will become apparent to those of ordinary skill in the art upon reading this disclosure, and it is intended that the scope of the invention disclosed herein be limited only by the broadest interpretation of the appended claims to which the inventor is legally entitled.

What is claimed is:

1. An apparatus for positioning and holding an absorbent dog waste disposal pad on a separate underlying support surface, the apparatus comprising:

upper and lower frames having at least two opposing sides defining a distance therebetween;

the lower frame comprising first and second lower frame members, each lower frame member having first and second ends and inside and outside bottom edges connected by an upwardly curved surface, the first and second ends of the first lower frame member being cooperatively alignable with the second and first ends of the second lower frame member to define a substantially planar, polygonal open area enclosed by the lower frame when the lower frame is placed on the underlying support surface;

the upper frame comprising two upper frame members generally alignable with the two lower frame members, each upper frame member having first and second ends spaced apart from the ends of the first and second lower frame members, and a downwardly facing cavity inside each of the upper frame members into which the upwardly curved surface of the lower frame is at least partially nestable to securely hold between the at least two opposing sides of the assembled upper and lower frames an absorbent dog waste disposal pad having at least one dimension greater than the distance between the at least two opposing sides.

2. The apparatus of claim 1 wherein the lower and upper frames form a generally rectangular peripheral wall.

3. The apparatus of claim 2 wherein the lower and upper frames form a square peripheral wall.

4. The apparatus of claim 1 wherein the lower and upper frames are made of a moldable polymeric material.

5. The apparatus of claim 1 wherein each lower frame member has at least one male end connector and at least one female end connector.

6. The apparatus of claim 5 comprising first and second upper frame members having ends that abut when installed in opposed relation over the lower frame.

7. The apparatus of claim 5 wherein each upper frame member has at least one male end connector and at least one female end connector.

8. The apparatus of claim 1 wherein each lower frame member has ends that abut when the lower frame is assembled.

9. The apparatus of claim 8 comprising first and second upper frame members having ends that abut when installed in opposed relation over the lower frame.

10. The apparatus of claim 8 wherein each upper frame member has at least one male end connector and at least one female end connector.

11. The apparatus of claim 1 comprising first and second upper frame members having ends that abut when installed in opposed relation over the lower frame.

12. The apparatus of claim 1 comprising interlocking first and second upper frame members.

13. The apparatus of claim 1 comprising interlocking first and second lower frame members.

14. The apparatus of claim 1 wherein the lower and upper frames have inverted U-shaped cross sections.

15. The apparatus of claim 1 wherein the absorbent pad is larger in length and width than the lower frame.

16. The apparatus of claim 1 wherein the lower frame comprises a plurality of reinforcement sections disposed beneath the upwardly extending surface.

17. The apparatus of claim 1 wherein the upper frame comprises a plurality of reinforcement sections disposed in the downwardly facing cavity.

18. The apparatus of claim 1 wherein the lower frame members have corners with integrally molded reinforcing flanges.

19. The apparatus of claim 1 wherein the upper frame members have corners with integrally molded reinforcing flanges.

20. The apparatus of claim 1 wherein the polygonal area has sides and wherein the ends of the upper and lower frame members are on different sides.

21. The apparatus of claim 1 in combination with an absorbent dog waste disposal pad.

22. The apparatus of claim 1 wherein the lower frame has underlying resilient adhesive-backed pads.

23. An absorbent dog waste disposal pad holder comprising:
   a lower first frame member having an inverted U-shaped cross section, the lower first frame member having a first end and a second end, the first end having a male end connector, the second end having a female end connector;
   a lower second frame member having an inverted U-shaped cross section, the lower second frame member having a first end and a second end, the first end having a male end connector, the second end having a female end connector;
   an upper first frame member having an inverted U-shaped cross section, the upper first frame member having two ends;
   an upper second frame member having an inverted U-shaped cross section, the upper second frame member having two ends;
   a disposable, absorbent pad;
   wherein the first end of the lower first frame member engages the second end of the lower second frame member and the second end of the lower first frame member engages the first end of the lower second frame member to form a lower frame, the two ends of the upper first frame member cooperate with the corresponding two ends of the upper second frame member to form an upper frame, the lower frame and the upper frame cooperate to form a peripheral wall, the peripheral wall securely holds a periphery of the disposable, absorbent pad between the lower frame and the upper frame at least at two opposed sides of the peripheral wall.

24. The absorbent dog waste disposal pad holder of claim 23 wherein the lower and upper frames form a generally rectangular peripheral wall.

25. The absorbent dog waste disposal pad holder of claim 24 wherein the lower and upper frames form a square peripheral wall.

26. The absorbent dog waste disposal pad holder of claim 23 wherein the disposable, absorbent pad is larger in length and width than the lower frame.

27. The absorbent dog waste disposal pad holder of claim 23 wherein the lower and upper frames are made of a moldable polymeric material.

28. The absorbent dog waste disposal pad holder of claim 23 wherein the lower frame comprises a plurality of reinforcement sections disposed beneath an upwardly extending surface of the lower frame.

29. The absorbent dog waste disposal pad holder of claim 23 wherein the upper frame comprises a plurality of reinforcement sections disposed in a downwardly facing cavity of the upper frame.

30. The absorbent dog waste disposal pad holder of claim 23 wherein the lower frame members have corners with integrally molded reinforcing flanges.

31. The absorbent dog waste disposal pad holder of claim 23 wherein the upper frame members have corners with integrally molded reinforcing flanges.

32. The absorbent dog waste disposal pad holder of claim 23 wherein the lower frame has underlying resilient adhesive-backed pads.

33. An apparatus for positioning and holding an absorbent dog waste disposal pad on a separate underlying support surface, the apparatus comprising:
   a lower frame having an inverted U-shaped cross section, the lower frame comprising a first frame member and a second frame member, the first frame member having a male end connector and a female end connector, the second frame member having a male end connector and a female end connector, the male and female end connectors of the first frame member being engageable with the female and male end connectors of the second frame member to form the lower frame;
   an upper frame having an inverted U-shaped cross section, the upper frame comprising a first upper frame member and a second upper frame member, the first upper frame member having two ends, the second upper frame member having two ends, the ends of the first upper frame member being alignable so as to be in opposed and abutting contact with the ends of the second upper frame members to form the upper frame;
   a disposable, absorbent pad;
   wherein the lower frame and the upper frame cooperate to form a generally rectangular peripheral wall, the generally rectangular peripheral wall securely holding a periphery of the disposable, absorbent pad between the lower frame and the upper frame at least at two opposed sides of the peripheral wall.

34. The apparatus of claim 33 wherein the lower and upper frames are made of a moldable polymeric material.

35. The apparatus of claim 33 wherein the lower frame comprises a plurality of reinforcement sections disposed beneath an upwardly extending surface of the lower frame.

36. The apparatus of claim 33 wherein the upper frame comprises a plurality of reinforcement sections disposed in a downwardly facing cavity of the upper frame.

37. The apparatus of claim 33 wherein the disposable, absorbent pad is larger in length and width than the lower frame.

38. The apparatus of claim 33 wherein the lower and upper frames form a square peripheral wall.

39. The apparatus of claim 33 wherein the lower frame members have corners with integrally molded reinforcing flanges.

40. The apparatus of claim 33 wherein the upper frame members have corners with integrally molded reinforcing flanges.

41. The apparatus of claim 33 wherein the lower frame has underlying resilient adhesive-backed pads.

42. The method for releasably supporting and maintaining an absorbent dog waste disposal pad, the method comprising the steps of:

providing a lower first frame member with inside and outside bottom edges connected by an upwardly curved surface and having first and second ends;

providing a lower second frame member with inside and outside bottom edges connected by an upwardly curved surface and having first and second ends;

providing an upper first frame member with a downwardly facing cavity and having two ends;

providing an upper second frame member with a downwardly facing cavity and having two ends;

providing a disposable, absorbent pad;

interlocking the first end of the lower first frame member with the second end of the lower second frame member and the second end of the lower first frame member with the first end of the lower second frame member to form a polygonal lower frame;

placing the disposable, absorbent pad on top of the lower frame, spanning at least two opposed sides of the lower frame;

engaging the downwardly facing cavity of the upper first frame member with the upwardly curved surface of the lower frame wherein the disposable, absorbent pad is held therebetween and the two ends of the upper first frame member are spaced apart from the ends of the first and second lower frame members; and engaging the downwardly facing cavity of the upper second frame member with the upwardly curved surface of the lower frame wherein the disposable, absorbent pad is held therebetween and the two ends of the upper second frame member abut the corresponding two ends of the upper first frame member to form a polygonal, upper frame wherein the lower frame and the upper frame securely hold the disposable, absorbent pad.

* * * * *